United States Patent [19]

Slane

[11] Patent Number: 5,668,952
[45] Date of Patent: Sep. 16, 1997

[54] METHOD FOR RESOLVING NETWORK ADDRESS BY SENDING RERESOLVE REQUEST TO NODES AT SELECTED TIME PERIOD AFTER ESTABLISHING ADDRESS TABLE, AND UPDATING THE TABLE WITH RECEIVED REPLY THERETO

[75] Inventor: Albert Alfonse Slane, Rochester, Minn.

[73] Assignee: International Business Machines Corporation, Armonk, N.Y.

[21] Appl. No.: 287,314

[22] Filed: Aug. 8, 1994

[51] Int. Cl.⁶ .............................. G06F 13/00; H04L 12/24
[52] U.S. Cl. .................. 395/200.75; 395/180; 395/557; 395/200.54; 395/200.57; 340/825.08; 340/825.52; 340/825.54; 370/254; 711/202; 711/210
[58] Field of Search ................... 364/DIG. 1, 242.94, 364/284, 284.4; 340/852.52, 852, 825; 370/97, 91, 92, 85.1, 85.9, 85.13, 77, 60, 254; 395/200, 180, 412, 420, 557

[56] References Cited

U.S. PATENT DOCUMENTS

| | | | |
|---|---|---|---|
| 4,718,005 | 1/1988 | Feigenbaum et al. | 364/200 |
| 4,866,704 | 9/1989 | Bergman | 370/85.4 |
| 4,996,524 | 2/1991 | Tojima | 340/825.02 |
| 5,185,860 | 2/1993 | Wu | 395/200 |
| 5,229,988 | 7/1993 | Marbaker et al. | 370/13 |
| 5,237,693 | 8/1993 | Kiyohara et al. | 395/725 |
| 5,278,829 | 1/1994 | Dunlap | 370/94.1 |
| 5,408,618 | 4/1995 | Aho et al. | 395/325 |
| 5,465,330 | 11/1995 | Komatsu et al. | 395/824 |

OTHER PUBLICATIONS

Plummer, David C., *An Ethernet Address Resolution Protocol—or—Converting Network Protocol Addresses to 48.bit Ethernet Address for Transmission on Ethernet Hardware*, Network Working Group, Request for Comments: 826, Nov. 1982.

*Primary Examiner*—Thomas C. Lee
*Assistant Examiner*—Ki S. Kim
*Attorney, Agent, or Firm*—Felsman, Bradley, Gunter & Dillon

[57] ABSTRACT

A networking system is disclosed that has an improved address resolution protocol. The network system, which includes a table or cache, has a plurality of nodes, each node having a unique address. The protocol establishes in the table an address mapping for each of the nodes in the network system being used. The protocol generates a target address for an addressing request. When an address mapping needs to be reresolved/refreshed, the protocol then sends the request to the node associated with the address currently in the table. The protocol allows for a certain amount of time for the node to accept the request and then updates the address mapping table based upon a reply received within that limited time. If the node fails to reply within a given time, the protocol then broadcasts the request throughout the networking system until a response is received. Once a response is received, the system then updates the table of address mapping.

3 Claims, 2 Drawing Sheets

METHOD FOR RESOLVING NETWORK ADDRESS BY SENDING RERESOLVE REQUEST TO NODES AT SELECTED TIME PERIOD AFTER ESTABLISHING ADDRESS TABLE, AND UPDATING THE TABLE WITH RECEIVED REPLY THERETO

BACKGROUND OF THE INVENTION

1. Technical Field

The present invention generally relates to a local area network and, more specifically to streamlining the addressing efficiency over the network. More particularly still, the present invention relates to an improved address resolution protocol, which allows address resolution protocol traffic to be sent to only those nodes addressed without having to broadcast the message through all nodes possible on the network.

2. Description of the Related Art

A conventional local area network is designed to allow several individual computers to communicate one to another over the network. Typically, these networks include a server computer, which is used to broadcast messages and control flow over the network for all connected computers or nodes.

To communicate over the network system, an address resolution protocol (ARP) is used. ARP allows the nodes to find one another via the internet protocol (IP) addressing in the network environment in a conventional fashion to those skilled in the art. ARP protocol maps IP addresses to physical device addresses. For example, a first node on the LAN finds a second node using the same LAN by sending an ARP request packet onto the LAN.

The ARP request packet is then sent out on the LAN to all devices located on the LAN via a broadcast frame. Every device looks at and processes the ARP request packet and only the actually targeted address responds to the packet. Additionally, each ARP mapping is also aged as it remains in use and, as it becomes old, the process is repeated to refresh the address mapping. This reresolution generates a significant amount of LAN traffic and every node on the network sees each generated frame because the requests are broadcast. In turn, every node must waste valuable processing time determining whether this frame is for the node or not.

Accordingly, what is needed is an improved reresolution protocol that greatly reduces LAN traffic by generally avoiding broadcast requests in favor of specific adapter targeted requests.

SUMMARY OF THE INVENTION

It is therefore one object of the present invention to provide a local area network.

It is another object of the present invention to provide streamlined addressing efficiency over the network.

It is yet another object of the present invention to provide an improved address resolution protocol, which allows address resolution protocol traffic to be sent to only those nodes addressed without having to broadcast the message through all nodes possible on the network.

The foregoing objects are achieved as is now described. According to the present invention, a networking system is disclosed that has an improved address resolution protocol. The network system, which includes a table or cache, has a plurality of nodes, each node having a unique address. The protocol establishes in the table an address mapping for each of the nodes in the network system being used. The protocol generates a target address for an addressing request. When an address mapping needs to be reresolved/refreshed, the protocol then sends the request to the node associated with the address currently in the table. The protocol allows for a certain amount of time for the node to accept the request and then updates the address mapping table based upon a reply received within that limited time. If the node fails to reply within a given time, the protocol then broadcasts the request throughout the networking system until a response is received. Once a response is received, the system then updates the table of address mapping.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
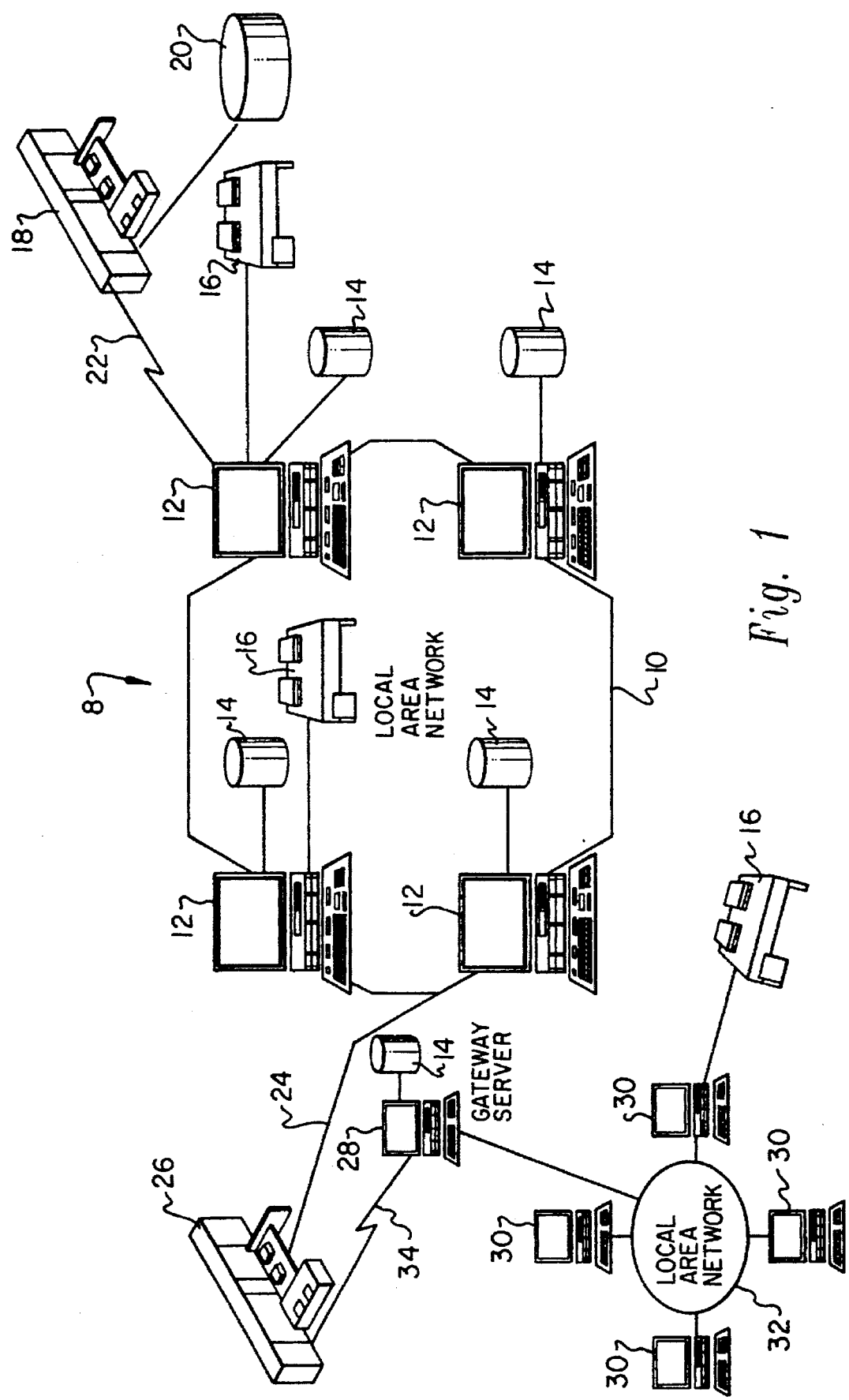
FIG. 1 depicts a block diagram of a internet system upon which the present invention operates.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within distributed data processing system 8, in accordance with the method and system of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that distributed data processing system 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. A second Local Area Network (LAN) 32 may be coupled to Local Area Network (LAN) 10 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored.

Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 8 and periodically "locked" to prevent access by other users.

The network system 8 depicted in FIG. 1 typically uses an address resolution protocol (ARP) for controlling messages sent across the network. The address resolution protocol typically has an associated ARP request frame that is sent out as an all routes broadcast frame. This broadcast frame is then sent out to all hosts at least once. The messages are initially broadcast because the address mapping is not known. From time to time data is timed out to allow the remote device addresses to change. Although the initial broadcast is necessary at the start to map all addresses, subsequent broadcasting becomes unnecessary since most of the mapping information is accurate. This greatly increases LAN traffic. Since the mapping information is typically accurate, the broadcasting should only be conducted on those occasions when an address change has occurred. An address change is detected when no response is received to the initial re-resolve request. In this situation, a broadcast message should be sent out to find the missing address so that the cache or table can be updated.

The ARP protocol uses a cache or table to keep address mapping information current. Thus, if any entry changes, the cache can be dynamically updated. The current Request for Comments (RFC), 826 specifies that an entry is reresolved when it times out. Timing out is the process where an entry is aged for a configurable time period. At the end of that time period, the entry is considered timed-out or stale. At this point the entry is re-verified by reresolving it. This then requires sending a broadcast frame to all nodes on the network. On a transmission control protocol (TCP) network, ARP frames can consume a large percentage of the total traffic and each node wastes time processing each ARP request that comes in because it is most likely not for that node. The only node that does any useful work is that node to which the ARP request was destined.

The present invention overcomes these problems by, when an entry in the cache times out, re-resolving the entry using a specifically targeted (nonbroadcast) frame using the current information contained in the cache/table. This means that the frame will only be received by the destined target. This eliminates unnecessary node processing because the frame is only sent to the target node originally intended. The system accommodates the situation where the address of a remote node has changed as signaled by the failure of the initial re-resolve. The system then attempts to find the node using the broadcast method, which allows nodes to change addresses as per the RFC.

Figure 2:
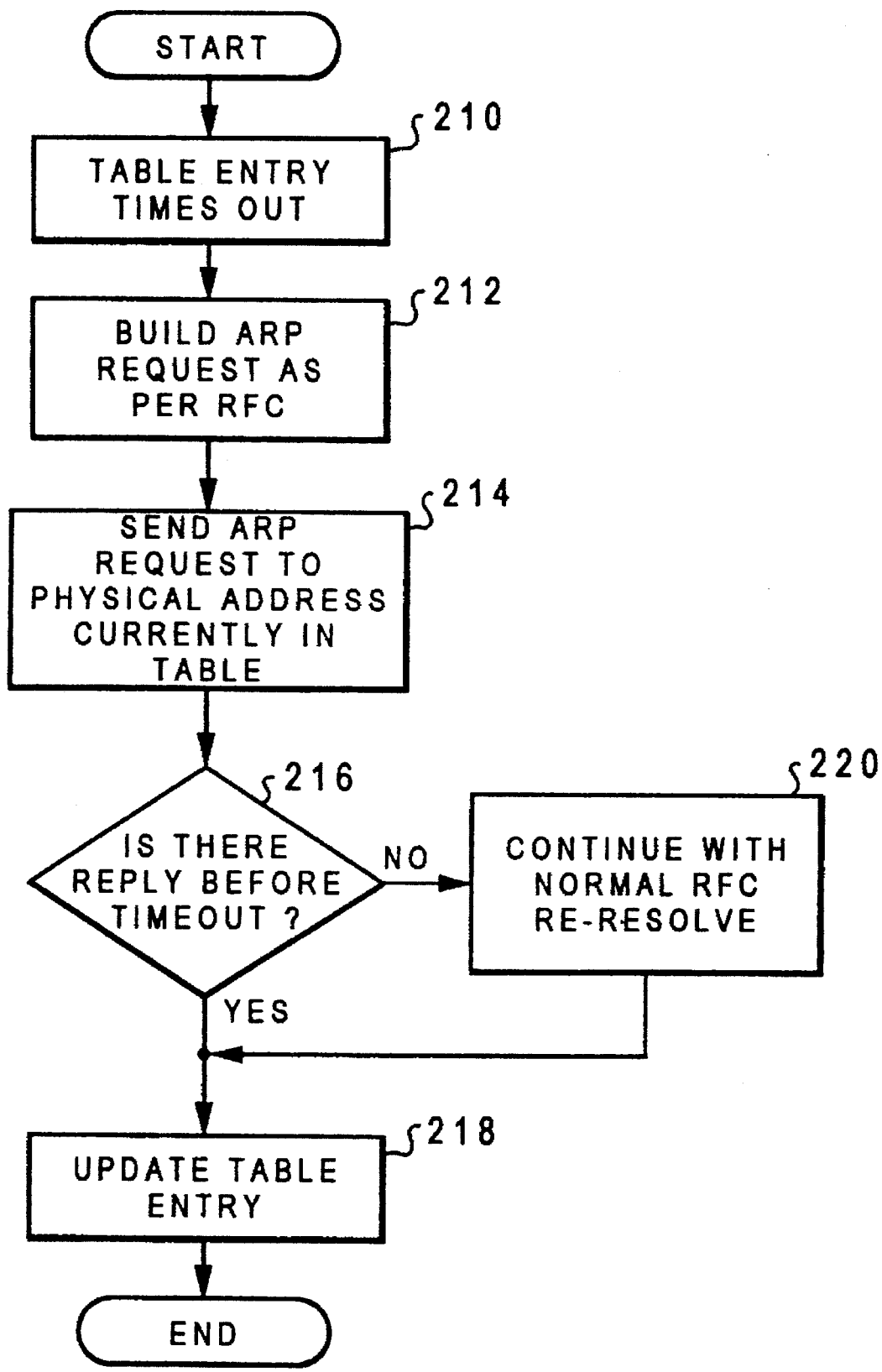
FIG. 2 is flowchart illustrating an operation of the present invention for target messaging.

Upon the initial establishment of the network, a table is established in the caching system, which table contains all the node entries currently being used on the network. FIG. 2 depicts a flowchart of how the improved ARP proceeds to send ARP reresolve requests over the network. Once an address request is invoked at the start, the protocol allows a node to time out, which is recorded in the table entry of step 210. In step 212, the protocol builds an ARP request as per the RFC. Then, in step 214, the system sends the ARP request to the specific physical address currently in the table. The ARP protocol maps IP addresses to physical addresses. Next, in step 216, the system listens for a reply before a time out. If a reply is received, in step 218, the system updates the table entry with the data in the reply received, which contains the address mapping of the destined node to which the message was sent. If the reply was not received before the timeout, the system, in step 220, then sends a broadcast message throughout the network until the destination is located and the address is then updated into the table entry in the cache.

While the invention has been particularly shown and described with reference to a preferred embodiment, it will be understood by those skilled in the art that various changes in form and detail may be made therein without departing from the spirit and scope of the invention.

I claim:

1. A method of operating a network system having a plurality of nodes, each node having an assigned address, the method comprising the steps of:

establishing in an address table an address mapping associated with each of said plurality of nodes on the network system at a given time;

detecting passage of a selected time period after said given time and generating a timeout signal in response thereto;

upon occurrence of said timeout signal, generating a target address for a selected node whose address is found in said table;

sending a reresolve request to said selected node associated with said address currently in said address table;

waiting for a reply from said targeted address of said node;

upon receipt of a reply, updating said address table with said target address for said node;

upon failure to receive a reply within a given time, broadcasting a message across said network system until a response is received from said targeted node;

upon the receipt of said response, updating said address table with said received response.

2. The method of operating a network system according to claim 1 wherein said step of sending a reresolved request to said selected node associated with said address currently in said address table comprises the step of sending a reresolved request to said selected node associated with said address currently in said address table utilizing said address mapping stored within said address table for reverifying said address mapping.

3. The method of operating a network system according to claim 1 when said step of establishing in an address table an address mapping associated with each of said plurality of nodes on the network system at a given time comprises the step of establishing an address table within a cache within each of said plurality of nodes.

* * * * *